Figure 1:
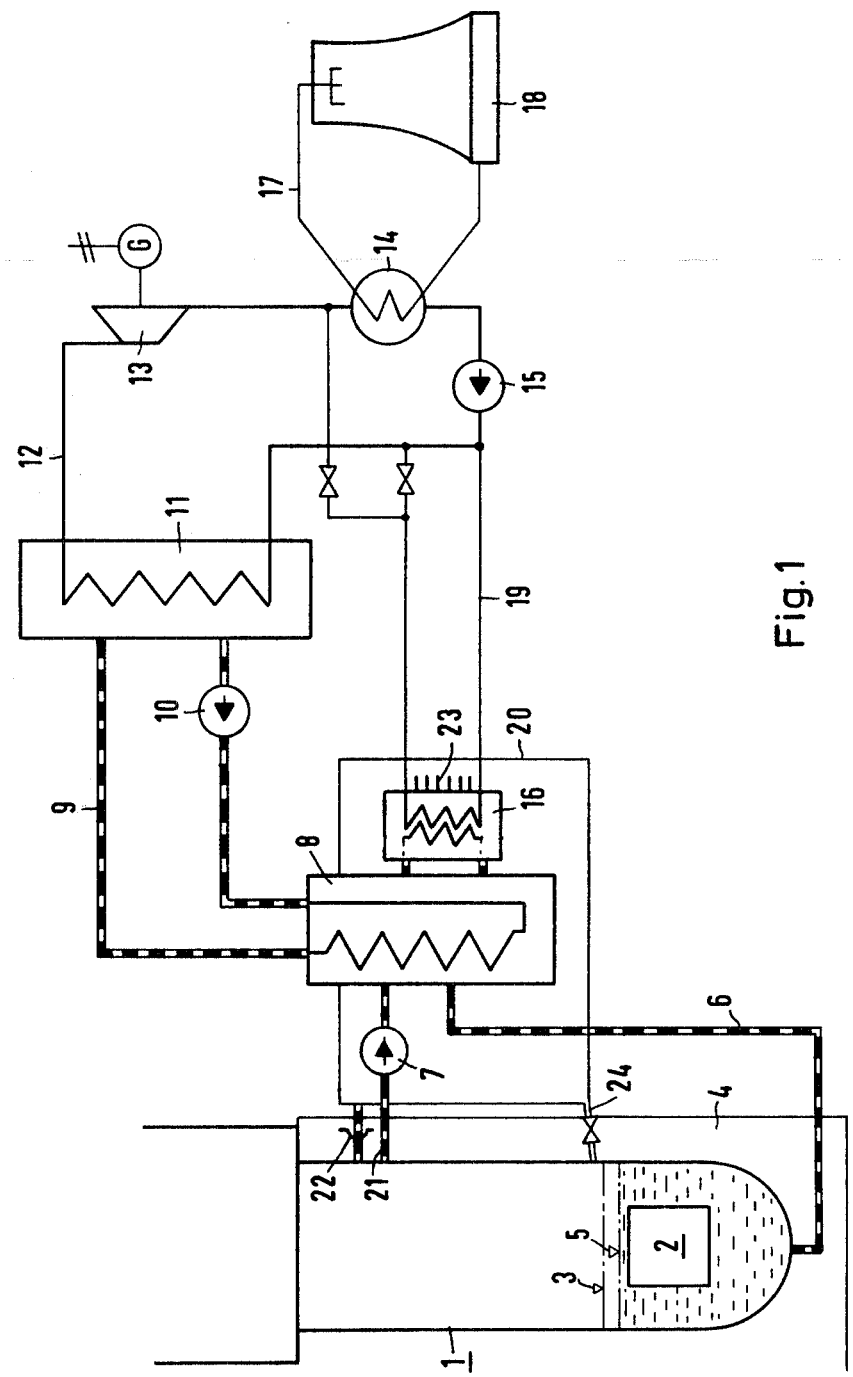

United States Patent [19]

Buscher et al.

[11] 4,186,051
[45] Jan. 29, 1980

[54] NUCLEAR ENERGY PLANT WITH IMPROVED DEVICE FOR REMOVING AFTER-HEAT AND EMERGENCY HEAT

[75] Inventors: Enno Buscher, Bergisch Gladbach; Kurt Vinzens, Overath, both of Fed. Rep. of Germany

[73] Assignee: Interatom, Internationale Atomreaktorbau GmbH, Bergisch Gladbach, Fed. Rep. of Germany

[21] Appl. No.: 795,852

[22] Filed: May 11, 1977

[30] Foreign Application Priority Data

May 13, 1976 [DE] Fed. Rep. of Germany ....... 2621258

[51] Int. Cl.$^2$ .................... G21C 15/00; G21C 9/00; G12D 5/00
[52] U.S. Cl. ...................................... 176/65; 60/644; 176/38
[58] Field of Search ....................... 176/65, 60, 40, 55, 176/38; 60/644

[56] References Cited

U.S. PATENT DOCUMENTS

| | | | |
|---|---|---|---|
| 3,374,149 | 3/1968 | Parris | 176/65 |
| 3,421,978 | 1/1969 | Gollion | 176/65 |
| 3,434,924 | 3/1969 | Pouderoux | 176/65 |
| 3,748,227 | 7/1973 | Hillekum | 176/87 |

FOREIGN PATENT DOCUMENTS 1421826 1/1976 United Kingdom ...................... 176/65

Primary Examiner—Samuel W. Engle
Assistant Examiner—Donald P. Walsh
Attorney, Agent, or Firm—Herbert L. Lerner

[57] ABSTRACT

Nuclear energy installation includes a nuclear reactor core, a primary circulatory loop connected to the reactor core and having a circulating liquid metal medium therein heated by the reactor core, a first heat exchanger having a primary side connected in the primary circulatory loop, and a secondary side, a secondary circulatory loop connected to the secondary side of the first heat exchanger and having a circulating liquid metal medium therein heated by heat transfer in the first heat exchanger from the liquid metal medium of the primary circulatory loop, a second heat exchanger having a primary side connected in the secondary circulatory loop, and a secondary side, a tertiary circulatory loop connected to the secondary side of the second heat exchanger and having a circulating water/steam medium therein heated by heat transfer in the second heat exchanger from the liquid metal medium of the secondary circulatory loop, a condenser having a vapor/condensate side thereof connected in the tertiary circulatory loop, and a coolant side thereof connectible to a heat sink outside the installation, a third heat exchanger having a primary side connected to the primary side of the first heat exchanger, and having a secondary side, a quaternary coolant loop connected to the secondary side of the third heat exchanger and connectible through the condenser to the heat sink.

7 Claims, 2 Drawing Figures

NUCLEAR ENERGY PLANT WITH IMPROVED DEVICE FOR REMOVING AFTER-HEAT AND EMERGENCY HEAT

The invention relates to a nuclear energy plant or installation with improved devices for removing after-heat and for emergency removal of heat. More particularly, the invention relates to such a nuclear energy installation having at least one primary circulatory loop circulating liquid metal, which surrenders the heat thereof, in a first heat exchanger, to a secondary circulatory loop also circulating liquid metal which, in turn, gives up the heat thereof, in a second heat exchanger, to a tertiary circulatory loop circulating water/steam, the liquid metal of the primary circulatory loop being heated up in the nuclear reactor, and the steam produced in the tertiary circulatory loop being employed, for example, to drive machines. For safety reasons and in order to keep the individual circulatory loops within justifiable dimensions, nuclear energy installations of the aforedescribed type are generally provided with several similar heat-exchange chains, such as four of such chains, for example. The liquid metal that is used as coolant in the nuclear energy installations is usually liquid sodium, however, other metals have also been proposed therefor, such as a sodium-potassium eutectic, for example. When these metals encounter water, as is generally known, extremely violent chemical reactions occur.

The liquid metal circulating in the primary circulatory loop becomes radioactive when passing through the nuclear reactor. Since a leak in a heat exchanger cannot be completely avoided, this liquid metal does not surrender the heat thereof directly to the water/steam circulatory loop, but rather on a round-about path, through a secondary circulatory loop. If a leak appears in the second heat exchanger and a sodium-water reaction accordingly occurs, the reaction products can be conducted away or discharged without having to fear any radiological endangerment to the surroundings.

Nuclear reactors must be provided with devices for assuring that after-heat produced also when the reactor is shut down can be removed. According to the state of the art exemplified in British Pat. No. 14 21 826, these devices are formed of a plurality of special circulatory loops which have immersion coolers or condensers disposed in the reactor vessel usually laterally and above the core unit and leading to an external heat sink. This disposition of the devices for removing after-heat demands an enlargement of the reactor vessel, which means not only an increase in cost, but also, with reactors having high power output, the technical realization thereof is placed in doubt thereby. In addition it has become questionable whether the aforedescribed circulatory loops will remain functional even if an over-promptly critical excursion (a so-called Bethe-Tait Accident) occurs. Destruction of the reactor internals can then result whereupon, due to deficient heat removal, the coolant would vaporize and the core unit would ultimately become exposed. In order to prevent the then conceivable melting of the core unit, the patentees of U.S. Pat. No. 3,748,227 and British Pat. No. 13 99 841 have proposed a safety vessel system wherein a pressure-relieving chamber with a heat sink preferably formed of concrete discs is provided, the heat sink being disposed above the reactor cell per se and connected therewith. The vaporizing coolant would condense in the heat sink and would be re-conducted into the reactor cell wherein it would be introduced anew for cooling the core unit. The concrete masses provided as heat sinks require considerable space.

It is accordingly an object of the invention to provide a liquid metal-cooled nuclear energy installation of the aforedescribed type that is provided with devices for removing after-heat that are withdrawn from the direct effect of disturbances taking place in the reactor vessel and, in the event of a breakdown of this after-heat removal due to damage to the primary circulatory loop, can be made available for the emergency heat removal which then becomes necessary. In addition it is an object of the invention to provide such a device as to permit a reduction in size of the reactor vessel.

With the foregoing and other objects in view, there is provided, in accordance with the invention, a nuclear energy installation comprising a nuclear reactor core, a primary circulatory loop connected to the reactor core and having a circulating liquid metal medium therein heated by the reactor core, a first heat exchanger having a primary side connected in the primary circulatory loop, and a secondary side, a secondary circulatory loop connected to the secondary side of the first heat exchanger and having a circulating liquid metal medium therein heated by heat transfer in the first heat exchanger from the liquid metal medium of the primary circulatory loop, a second heat exchanger having a primary side connected in the secondary circulatory loop, and a secondary side, a tertiary circulatory loop connected to the secondary side of the second heat exchanger and having a circulating water/steam medium therein heated by heat transfer in the second heat exchanger from the liquid metal medium of the secondary circulatory loop, a condenser having a vapor/condensate side thereof connected in the tertiary circulatory loop, and a coolant side thereof connectible to a heat sink outside the installation, a third heat exchanger having a primary side connected to the primary side of the first heat exchanger, and having a secondary side, a quaternary coolant loop connected to the secondary side of the third heat exchanger and connectible through the condenser to the heat sink. In accordance with another feature of the invention a quintary circulatory loop is connected to the coolant side of the condenser, the heat sink being connected in the quintary circulatory loop.

The third heat exchanger need not be disposed within the reactor vessel and is thus withdrawn from the direct effect of any disruptions that may occur in the reactor vessel. These third heat exchangers can be optimized for the removal of after-heat that is anticipated typically as being approximately 2.5% of the power output at full load so that two of these proposed third heat exchangers together are advantageously adequate for removing the after-heat in an installation with four circulatory loops. If the after-heat must, however, be removed through the heat exchangers provided for normal operation of the nuclear energy installation, unstable cooling conditions may develop therein because of the limited equalization or balancing. In addition, upon the occurrence of a leak in such a heat exchanger, the transport of reaction products to the indicating instruments can take so long that timely application of counter-measures may be impeded. If after-heat is removed through the third heat exchangers, in accordance with the invention, the second heat exchangers i.e. the steam generators, can vaporize or stop vaporizing without danger. In the event of disruptions or disturbances which require only a brief shut-down of the reactor, the steam produced with the after-heat in the third heat exchangers can be used to keep the second heat exchangers hot so that, after removal of the disruption, the latter can be started up again immediately.

In accordance with a further feature of the invention, the nuclear energy installation includes means for selectively connecting the secondary side of the third heat exchanger to the second heat exchanger and to the tertiary circulatory loop i.e. that the selectively connecting means are employed, in normal operation, to superheat the steam generated in the second heat exchanger or to preheat the feedwater fed to the second heat exchanger.

In accordance with an additional feature of the invention, the third heat exchanger is a three-substance heat exchanger wherein a contact medium chemically compatible with the liquid metal medium in the primary side of the third heat exchanger and the water/steam medium in the secondary side of the third heat exchanger and effecting heat transfer between the media is received. Such a heat exchanger, which employs a lead-bismuth eutectic as contact medium compatible with sodium as well as with water, was proposed in German Published Non-Prosecuted Application DT-OS 23 60 257. Such a heat exchanger possesses an especially large heat-retaining capacity and is protected in a particular manner against damage due to the leaking of individual tubes.

In accordance with an added feature of the invention, the nuclear energy installation includes a first chamber wherein the nuclear reactor core is received, a second chamber wherein the third heat exchanger is received, the second chamber being separated from the first chamber and being disposed at a higher hydrostatic level than the first chamber, and means for connecting the second chamber to the first chamber. If the primary circulatory loop is so badly damaged in a serious accident that heat removal therethrough is no longer possible, the third heat exchanger thus still performs the function thereof in the emergency removal of heat. The coolant vaporized in the nuclear reactor and flowing into the pressure-relieving chamber of the hereinaforementioned safety vessel system then condenses at the outside of the third heat exchanger and can be returned to the reactor vessel, thereby assuring the maintenance of the emergency coolant level necessary for cooling the reactor core.

In accordance with yet another feature of the invention, the nuclear reactor installation includes means disposed on the outside of the third heat exchanger for promoting heat transfer thereto from the surroundings thereof, such as cooling ribs or vanes.

In accordance with a concomitant feature of the invention, the third heat exchanger and the second heat exchanger form a common structural unit, for example, by building the third heat exchanger concentrically or coaxially to and around the second heat exchanger. Necessity for a fixed mounting point or anchorage for the third heat exchanger which would limit the otherwise unlimited thermal expansion thereof is thus dispensed with, and keeping the second heat exchanger hot, when the reactor is shut down only temporarily, is facilitated.

Other features which are considered as characteristic for the invention are set forth in the appended claims.

Although the invention is illustrated and described herein as nuclear energy plant with improved device for removing after-heat and emergency heat, it is nevertheless not intended to be limited to the details shown, since various modifications may be made therein without departing from the spirit of the invention and within the scope and range of equivalents of the claims.

Figure 2:
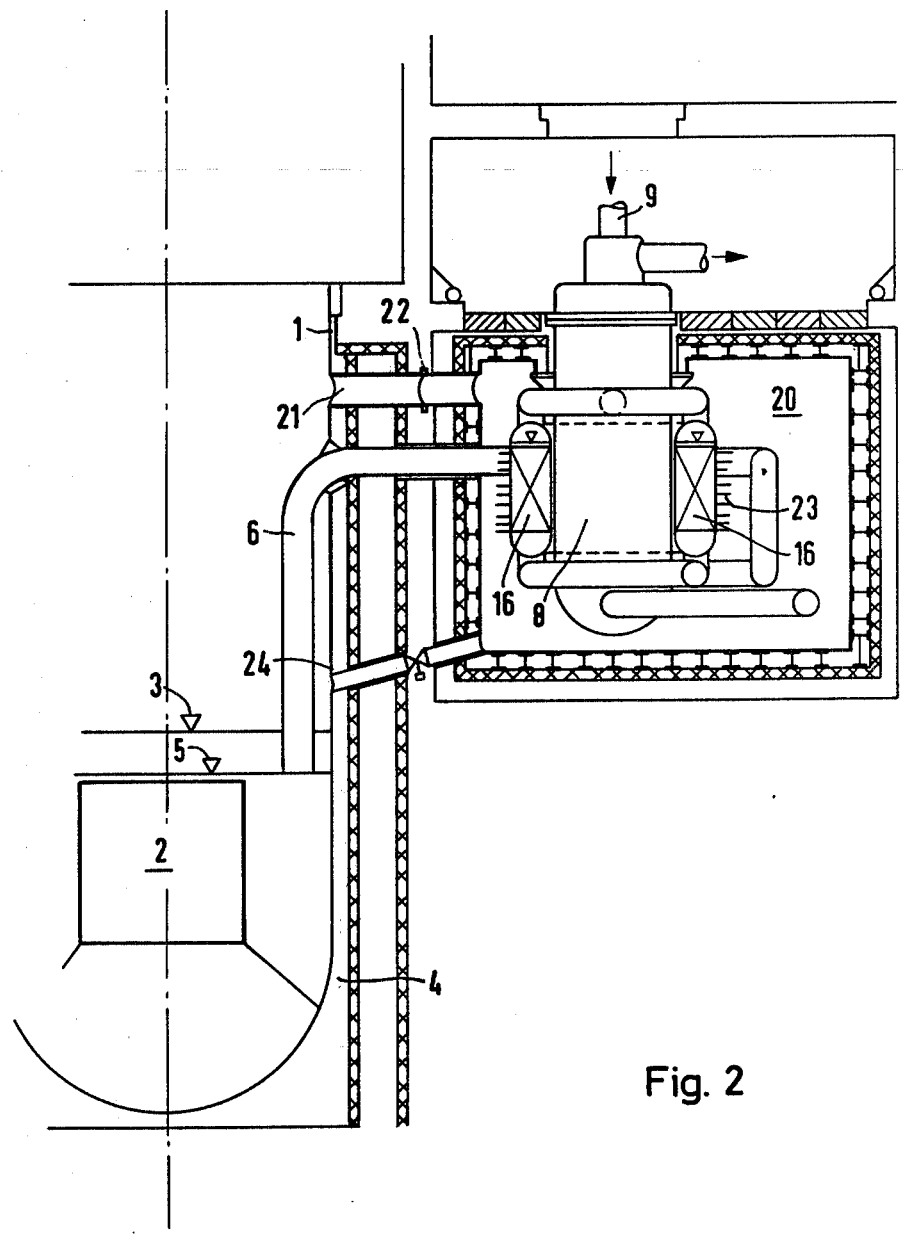

The invention, however, together with additional objects and advantages thereof will be best understood from the following description when read in connection with the accompanying drawings, in which:

FIG. 1 is a diagrammatic and schematic view of the nuclear energy plant with improved devices for removing after-heat and emergency heat in accordance with the invention; and FIG. 2 is an enlarged, partly diagrammatic fragmentary view of FIG. 1 showing the spatial disposition of the various components essential to the invention.

Referring now to the drawing and first, particularly, to FIG. 1 thereof, there is shown a nuclear energy plant including a reactor vessel or tank 1 wherein a reactor core 2 is received. A coolant, such as liquid sodium, for example, is also received in the vessel 1, extending up to a diagrammatically indicated operating level 3. If the reactor vessel 1, including the conventionally employed, though non-illustrated, double-walled vessel, were to spring a leak, for example due to an over-promptly critical excursion in the reactor core 2, the coolant flowing out through the leak flows into a reactor cell 4 while the operating level 3 of the coolant in the reactor vessel 1 sinks to a diagrammatically indicated emergency level 5 which, nevertheless, still covers the reactor core 2. During normal operation of the reactor, the heat produced in the reactor core 2 is removed through a primary circulatory loop 6 by the coolant which is circulated with the aid of a first pump 7. The coolant circulating in the primary loop 6, flows through a first heat exchanger 8 wherein the heat thereof is surrendered to a secondary coolant, for example, liquid sodium also, that circulates in a secondary coolant loop 9 with the aid of a second pump 10. This secondary coolant, in turn, gives up the heat thereof in a second heat exchanger 11 to water, in a tertiary circulatory loop 12, the water thereby vaporizing. The vaporized water or steam is employed for driving a turbogenerator 13, is liquefied in a condenser 14 and returned with the aid of a pump 15 to the second heat exchanger 11. Behind the first heat exchanger 8, a third heat exchanger 16 is connected in the primary circulatory loop 6, the third heat exchanger 16, as shown in FIG. 2, being built concentrically around the first heat exchanger 8. Whereas the first and second heat exchangers 8 and 11 are of conventional coil construction, for example, the third heat exchanger 16 is a so-called three-substance heat exchanger wherein the liquid metal-conducting heat-exchanger tubes of the primary circulatory loop 6 and the water conducting tubes of a quaternary circulatory loop 19 are disposed alternatingly and at a slight spacing from one another in a common vessel that is filled with a liquid metal, for example, a lead-bismuth eutectic, which effects heat transfer between both circulatory loops 6 and 19. With the aid of cross-connections in the loop 19, that are able to be shut off, the third heat exchanger 16 is incorporated on the water side thereof, into the third circulatory loop 12 either before the inlet thereof into the second heat exchanger 11 for feedwater preheating or behind the inlet thereof into the secondary heat exchanger 11 for steam superheating (not shown), or the third heat exchanger 16 can be connected to the primary side of the condensor 14, the secondary side of which is connected through a quintary circulatory loop 17 to an external heat sink 18 such as a cooling tower, for example, to remove the after-heat. The first and the third heat exchangers 8 and 16 are disposed together in a pressure-relieving chamber 20 which is located at a higher hydrostatic level than the reactor cell 4 is and is connected to the latter by means of a channel 21 which, during normal operation of the nuclear power plant, is closed by a rupture disc 22. If the primary circulatory loop 6 has been damaged so greatly during a serious accident that it is no longer possible to remove after-heat thereby, the coolant in the reactor vessel 1 or in the reactor cell 4 becomes superheated and subsequently vaporizes. The consequent pressure increase destroys the rupture disc 22, and the vaporized coolant flows into the pressure-relieving chamber 20 wherein it condenses at the third heat exchanger 16 which, as before, is connected through the condenser 14 to the external heat sink 18 and is provided with cooling ribs or vanes 23 for assisting the heat transfer. The condensed coolant flow back through the channel 24 into the reactor cell 4 and the reactor vessel 1, and thus maintains the emergency level 5 of the coolant.

It should be noted that the various circulatory loops are shown schematically in FIG. 1 and may, in fact, include other or more than one of the illustrated components therein such as, for example, a pump in the quintary circulatory loop 17.

There are claimed:

1. Nuclear energy installation comprising a nuclear reactor core, a primary circulatory loop connected to the reactor core and having a circulating liquid metal medium therein heated by the reactor core, a first heat exchanger having a primary side connected in said primary circulatory loop, and a secondary side, a secondary circulatory loop connected to said secondary side of said first heat exchanger and having a circulating liquid metal medium therein heated by heat transfer in said first heat exchanger from the liquid metal medium of said primary circulatory loop, a second heat exchanger having a primary side connected in said secondary circulatory loop, and a secondary side, a tertiary circulatory loop connected to said secondary side of said second heat exchanger and having a circulating water/-steam medium therein heated by heat transfer in said second heat exchanger from the liquid metal medium of said secondary circulatory loop, a condenser having a vapor/condensate side thereof connected in said tertiary circulatory loop, and a coolant side thereof connectible to a heat sink separate from said condenser, said heat sink being disposed outside the installation, a third heat exchanger having a primary side connected in said primary circulatory to the primary side of said first heat exchanger, and having a secondary side, a quaternary coolant loop separate from said tertiary circulatory loop, said quaternary being connected to said secondary side of said third heat exchanger and connectible through said condenser to said heat sink.

2. Nuclear energy installation according to claim 1 including a quintary circulatory loop connected to said coolant side of said condenser, said heat sink being connected in said quintary circulatory loop.

3. Nuclear energy installation according to claim 1 including means for selectively connecting the secondary side of said third heat exchanger to said second heat exchanger and to said tertiary circulatory loop.

4. Nuclear energy installation according to claim 1 wherein said third heat exchanger is a three-substance heat exchanger wherein a contact medium chemically compatible with the liquid metal medium in the primary side of said third heat exchanger and the water/steam medium in the secondary side of said third heat exchanger and effecting heat transfer between said media is received.

5. Nuclear energy installation according to claim 1 including a first chamber wherein said nuclear reactor core is received, a second chamber wherein said third heat exchanger is received, said second chamber being separated from said first chamber and being disposed at a higher hydrostatic level than said first chamber, and means for connecting said second chamber to said first chamber.

6. Nuclear energy installation according to claim 1 including means disposed on the outside of said third heat exchanger for promoting heat transfer thereto from the surroundings thereof.

7. Nuclear energy installation according to claim 1 wherein said third heat exchanger and said second heat exchanger form a common structural unit.

* * * * *